April 8, 1969   W. M. BERG   3,436,801
METHOD OF MAKING GEARED PULLEY TO ELIMINATE BURRS IN PULLEY
GROOVE AND TO FACILITATE ENTRY OF BELT INTO PULLEY
Filed June 23, 1966
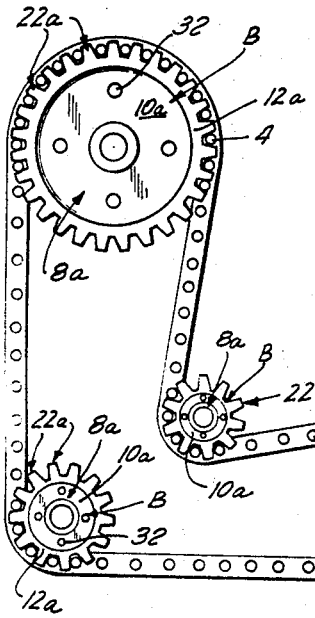
FIG.1
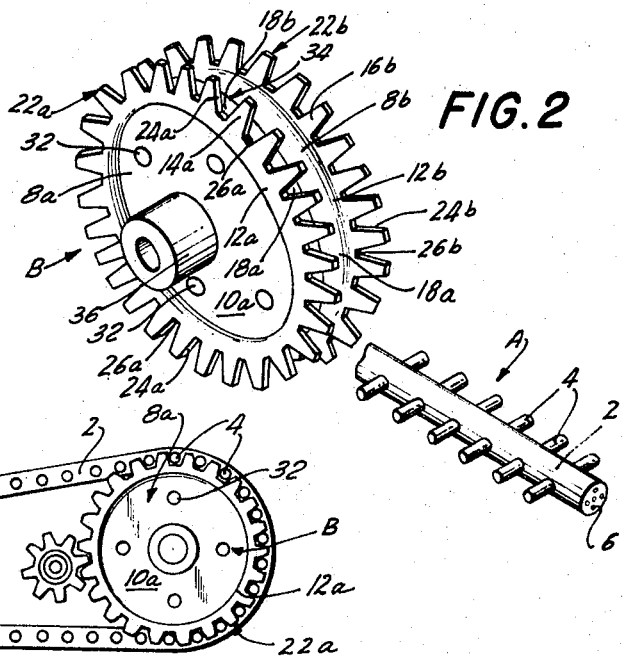
FIG.2
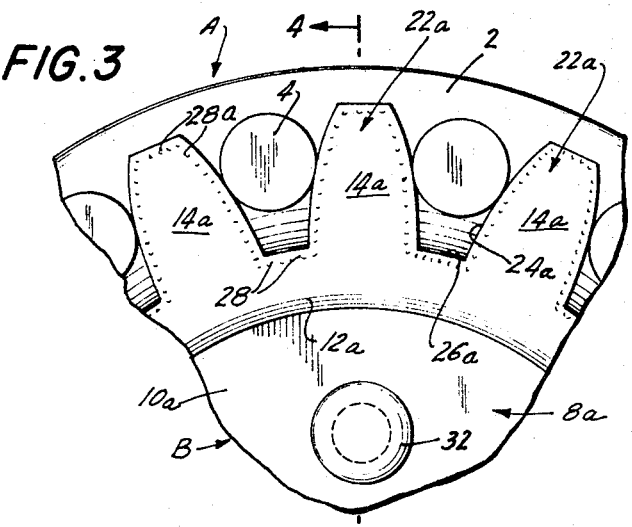
FIG.3
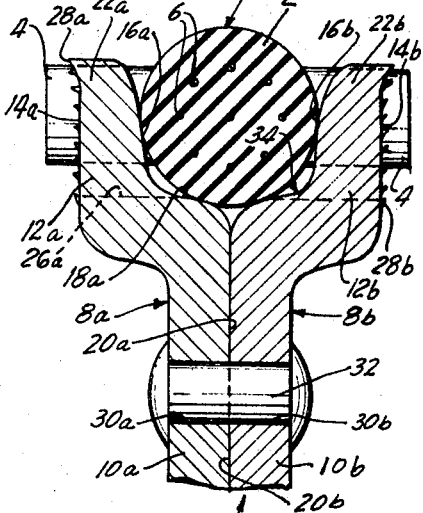
FIG.4
FIG.5
INVENTOR
WINFRED M. BERG
BY James and Franklin
ATTORNEY

United States Patent Office

3,436,801
Patented Apr. 8, 1969

3,436,801
METHOD OF MAKING GEARED PULLEY TO ELIMINATE BURRS IN PULLEY GROOVE AND TO FACILITATE ENTRY OF BELT INTO PULLEY
Winfred M. Berg, East Rockaway, N.Y., assignor to Pig Design Corp., East Rockaway, N.Y., a corporation of New York
Filed June 23, 1966, Ser. No. 559,965
Int. Cl. B21k *1/42;* B21d *39/02*
U.S. Cl. 29—159        13 Claims

ABSTRACT OF THE DISCLOSURE

A geared pulley into the pulley groove of which a belt is adapted to enter is made in two pieces, the forming of each piece being accomplished by moving a forming tool through the blank in a given direction, thereby to incline material in that direction and form burrs in the same direction, the pieces being subsequently assembled back-to-back so that the material inclination and burr orientation on each piece is outward, thereby facilitating the entry of the belt into the groove and minimizing burr-caused damage to the belt.

---

The present invention relates to a novel method for making a geared pulley.

In my Patent 3,026,737 of Mar. 27, 1962, entitled, "Belt Transmission System," I disclose a transmission belt of improved design and rotatable elements especially adapted to be used in conjunction therewith. The belt comprises a flexible elongated body portion with a series of registering pairs of elements extending laterally from both sides of that body portion, the elements having a height less than that of the body portion and being substantially centrally located relative to the height of the body portion. The rotatable elements especially adapted to be used in conjunction with that transmission belt are geared pulleys comprising a gear with gear teeth having a groove substantially centrally formed in the outer surface thereof, thereby providing gear teeth on opposite sides of the groove. The various parts are so dimensioned that the body portion of the transmission belt is received in the groove and preferably rests on the bottom thereof, while the laterally extending element pairs are received, preferably snugly, between the gear teeth on opposite sides of the groove.

As disclosed in the said Patent 3,026,737, the geared pulleys used with the transmission belt are formed from conventional spur gear blanks or from conventional spur gears themselves either by first forming a groove in the periphery of a gear blank and then cutting the gear teeth in conventional manner, or by machining the groove in the toothed surface of a pre-formed spur gear.

The transmission belt and geared pulley combination of the aforesaid Patent 3,026,737 has been widely used, and large numbers of transmission belts and geared pulleys for use therewith have been made and sold.

Problems have been experienced in the manufacture of the geared pulleys. When they are fabricated as taught in the aforementioned Patent 3,026,737, two major problems have arisen. One relates to the formation of burrs attendant upon the machining operations performed, and the other relates to the difficulty with which the body portion of the transmission belt enters the groove in the periphery of the geared pulley under certain conditions of use.

If the gear teeth are formed first, groove machining tends to distort them, and the interior of the groove is very badly burred. It is quite troublesome and expensive to remove the burrs from the inside of a groove, but unless they are removed they will cut, and very quickly destroy, the transmission belt with which they are used. Formation of the gears by first forming the groove and then machining the gear teeth is preferable because it substantially eliminates distortion of the gear teeth. However, the burr problem remains. In forming the gear teeth a machine tool element is passed laterally through the gear blank. Thus, in forming the gear teeth on one side of the groove, the tool moves from the outside of the gear into the groove; in forming the teeth on the other side of the groove the tool moves from the groove to the outside of the gear. In the first movement burrs are formed which primarily extend from the teeth into the groove; in the second movement burrs are formed primarily extending from the teeth laterally outwardly of the gear. The first mentioned burrs are in a position to cut and destroy a transmission belt; the second mentioned burrs are relatively harmless. Because of the existence of the first mentioned burrs, deburring is necessary inside the groove, and this adds appreciably to the cost of manufacture of the geared pulleys.

Moreover, since the groove in the periphery of the geared pulley is, as taught in my Patent 3,026,737, formed by a machining operation, the inwardly facing surfaces of the gear teeth are essentially perpendicular. Since the width of the groove is preferably only slightly greater than the lateral thickness of the body portion of the transmission belt, entry of the transmission belt body into the groove is not always easy, particularly if there is some slight misalignment between the geared pulley and the transmission belt.

It is the prime object of the present invention to provide a geared pulley suitable for use with transmission belts of the type shown in my Patent 3,026,737, but which avoid the problems outlined above, and particularly the problems of burrs in the pulley groove and the entry of the belt into that groove. It is a further prime object of the present invention to devise a method for making such geared pulleys which will reduce manufacturing costs and result in the production of geared pulleys of improved operating characteristics.

More specifically, it is an object of the present invention to provide a method of manufacturing geared pulleys which substantially eliminates any need for a deburring operation, and to produce thereby a geared pulley functionally superior to that disclosed in my Patent 3,026,737.

An important characteristic of the present invention is that the same technique which solves the burr problem, thus producing a geared pulley which does not tend to cut or destroy the transmission belt, also, and without having to use special equipment, produces a pulley having an outwardly flaring groove, thereby inherently providing a funnel-effect facilitating the entry of the transmission belt body into the groove.

To these ends, the grooved pulley of the present invention comprises two sections, each formed, preferably by stamping, from a blank of appropriate sheet material. The forming displaces a rim portion of the blank in the direction of movement of the forming tool and cuts the gear teeth in the thus-displaced rim portion by further movement of the forming tool in the same direction. Two such sections are secured together back-to-back in axial alignment and with their gear teeth in registration. The space between the displaced rim portions defines the peripheral groove of the assembled unit. Because of the direction of movement of the forming tool, which, for both of the gear sections, is in effect from the inside of the groove outwardly, burrs are formed only on the outer surfaces of the gear, and not on the inner surfaces of the groove. Hence deburring can be dispensed with if desired, since the burrs on the outside of the gear are of only minimal significance, and if deburring is desired, that can much more easily be accomplished on the periphery of the gear, which is the only place that the burrs are, than on the inside of the groove, as was necessary with prior art geared pulleys. Moreover, the movement of the forming tool outwardly of the groove for each section causes the inner surfaces of the groove to diverge outwardly, thus inherently producing the desired funnel effect.

To the accomplishment of the above, and to such other objects as may hereinafter appear, the present invention relates to a geared pulley construction, and to a method of making the same, as defined in the appended claims and as described in this specification, taken together with the accompanying drawing in which:

FIG. 1 is a side elevational view of an exemplary belt transmission system in which the present invention is embodied;

FIG. 2 is a three-quarter perspective exploded view of a typical embodiment of the geared pulley of the present invention, and of the transmission belt designed to be used therewith;

FIG. 3 is a fragmentary side elevational view, on an enlarged scale, of a portion of the geared pulley of the present invention, showing the transmission belt in operative engagement therewith;

FIG. 4 is a cross-sectional view taken along the line 4—4 of FIG. 3; and

FIG. 5 is a view similar to FIG. 4, but on a reduced scale, showing the construction of the present invention embodied in a multiple or gang pulley.

The transmission belt generally designated A, with which the geared pulley, generally designated B, of the present invention is adapted to be used, comprises a flexible elongated body 2 having a series of elements 4 extending laterally therefrom and longitudinally spaced therealong, the laterally projecting elements 4 preferably being provided in opposed pairs of elements, one element of each pair extending to each side of the belt body. The body 2 may be formed of any suitable flexible structural material, such as rubber or plastic, and longitudinally extending strength members 6, formed of flexible cable, Fiberglas, nylon cord or other inextensible material, may be embedded therein to prevent longitudinal stretch of the body 2. The cross-sectional shape of the body 2 is preferably symmetrical about a horizontal plane passing midway through the height thereof, and is here shown as circular in cross-section. The height of the laterally extending elements 4 is less than the height of the body 2, and those elements preferably are located midway of the height of the body 2.

The geared pulleys B of the present invention comprise a pair of sections 8a and 8b. Since the sections are substantially identical, the description of one will suffice for both, the same reference numerals being applied to corresponding parts, differentiated, however, by the letters a and b. Thus each section comprises a central base 10 with a rim portion 12 axially displaced from the base 10, the rim portion thus having an outer surface 14 and an inner surface 16, the inner surface 16 communicating with a surface 18 which extends at least partially axially and connects with the rear surface 20 of the base 10, that rear surface 20 preferably being flat and planar. Gear teeth 22 are formed in the rim portion 12, those teeth 22 being separated by spaces 24 having bottom surfaces 26.

Each section 8 may be very conveniently formed from a blank of sheet material as by a stamping operation, utilizing a stamping punch and die. Each section 8 may be formed from a preshaped circular blank, or that blank may, in the stamping or other forming operation, be in effect excised from a larger sheet. The direction of movement of the punch with respect to the blank is from the rear surface 20 of the base 10 outwardly, thereby to displace the rim portion 12 in that direction of movement. As the forming tool continues to move in that direction it excises material from the rim portion 12, thereby cutting the spaces 24 and forming the gear teeth 22. In so doing the forming tool carries the material of the blank along with itself, and hence burrs, represented by the reference numeral 28 and more or less schematically shown on an exaggerated scale in the drawing, are formed. Had those burrs been formed on the inner surface 16 of the rim portion 12 they would have been of major significance, since, as may be seen from FIG. 4, they would then have been in position to cut the body portion 2 of the transmission belt A and also to cut the laterally extending elements 4 near the points where they join the body portion 2. However, because of the direction of movement of the forming tool, those burrs 28 are virtually exclusively formed on the outwardly facing surface 14 of the rim portion 12 and consequently have but a minimal adverse effect on the transmission belt A.

Since the rim portion 12 and the gear teeth 22 constituting a part thereof are formed and shaped by a tool moving in the direction of displacement of the rim portion 12, and hence from surface 16 toward surface 14, the surface 16 is inherently caused to orient itself both radially and axially outwardly, as is clearly shown in FIG. 4.

Two identical sections 8 are assembled together back-to-back with their surfaces 20 abutting, and are brought into axial alignment and are rotated until their gear teeth 22 are in registration. The two sections are then secured together in any appropriate fashion. As here specifically disclosed, apertures 30 are formed in the bases 10, and rivets 32 are passed through the apertures 30 so as to secure the sections 8 in proper alignment both axially and rotationally. It will be understood, however, that any other desired type of securement could be employed, such as cementing, spot-welding, using nuts and bolts, or the like.

When the sections 8 are thus assembled together, the space between the facing surfaces 16a and 16b of the sections 8a and 8b defines the peripheral groove, generally designated 34, into which the body portion 2 of the belt A is adapted to be received, the width and depth of the groove 34 being determined, in accordance with the dimensioning of the forming tools, so as to correspond in appropriate fashion to the dimensions of the body portion 2 of the belt A with which the thus-produced grooved pulley is adapted to be used. Similarly, the design of the forming tool will determine the shape and size of the gear teeth 22 and the spaces 24 therebetween, making them correspond to the dimensions of the laterally extending belt elements 4. As may be seen from FIG. 4, inwardly facing surfaces 16a and 16b of the gear teeth 22a and 22b respectively incline axially outwardly as they approach the periphery of the assembled unit, this being a consequence of the manner in which the rim portions 12a and 12b are formed. This inclination of the surfaces 16a and 16b produces a groove 34 which is somewhat wider at its periphery than in its main portion, thus producing a funnel-effect which guides the belt body portion 2 into the groove 34 even if there is some moderate misalignment between the belt A and the geared pulley B.

The base 10 of each section 8 may be provided with a central aperture into which a hub 36 is adapted to be secured in known fashion. Moreover, if desired, and as indicated in FIG. 5, a series of individual geared pulleys B may be assembled together in axial alignment with the outer surfaces 14 of their rim portions 12 abutting one another, as by the use of a series of elongated rivets or bolts 32' passing through the aligned sets of apertures 30a, 30b, in each of the geared pulley assemblies B, thereby to produce a multiple or gang pulley. The burrs 28 on facing surface 14 are flattened when the pulleys B are thus ganged or assembled.

Through the use of the technique taught, geared pulleys suitable for use with transmission belts A of the type under discussion can be produced rapidly and inexpensively, yet to a very high degree of accuracy. Because of the method involved and the structure produced thereby, it is usually feasible to entirely dispense with deburring operations, and for those rare situations where deburring is desired it may be accomplished much more readily and effectively than has formerly been the case, since the burrs 28 are readily accessible on the exterior of the unit. In addition, operative engagement between the geared pulley assembly thus produced and the transmission belt is improved, since a funnel-shaped groove is produced without having to perform any special mechanical operations to that end.

While but a limited number of embodiments of the present invention have been here specifically disclosed, it will be apparent that many variations may be made therein, all within the scope of the instant invention, as defined in the following claims.

I claim:

1. The method of making geared pulleys which comprises: forming a pair of sections so that each section comprises a central base, a rim portion axially displaced in a given direction from said base, and gear teeth in said rim portion, said gear teeth being formed in said rim portion by passing a forming tool through said rim portion in said given direction; axially aligning said sections base-to-base with their rim portions extending in opposite axial directions and with their gear teeth in registration; and securing said sections to one another in said aligned position.

2. The method of claim 1, in which said forming step comprises stamping each section from sheet material.

3. The method of claim 2, in which the surface of said rim portion facing in the direction of said base and adjacent the periphery of said section is formed to extend radially inwardly and axially in the direction of said base.

4. The method of claim 2, in which the surface of said rim portion facing in the direction of said base and adjacent the periphery of said section is formed to extend radially inwardly and axially in the direction of said base and to communicate with a substantially axially extending surface.

5. The method of claim 1, in which said forming step comprises stamping each section from sheet material by a single movement of a stamping tool in said given direction.

6. The method of claim 5, in which the surface of said rim portion facing in the direction of said base and adjacent the periphery of said section is formed to extend radially inwardly and axially in the direction of said base.

7. The method of claim 5, in which the surface of said rim portion facing in the direction of said base and adjacent the periphery of said section is formed to extend radially inwardly and axially in the direction of said base and to communicate with a substantially axially extending surface.

8. The method of claim 1, in which the surface of said rim portion facing in the direction of said base and adjacent the periphery of said section is formed to extend radially inwardly and axially in the direction of said base.

9. The method of claim 1, in which the surface of said rim portion facing in the direction of said base and adjacent the periphery of said section is formed to extend radially inwardly and axially in the direction of said base and to communicate with a substantially axially extending surface.

10. The method of making geared pulleys which comprises: forming a pair of sections so that each section comprises a central base, a rim portion axially displaced in a given direction from said base, and gear teeth in said rim portion, the surface of said rim portion facing in the direction of said base and adjacent the periphery of said section being formed to extend radially inwardly and axially in the direction of said base, said rim portion surface being formed by the movement of a forming tool in said given direction; axially aligning said sections base-to-base with their rim portions extending in opposite axial directions and with their gear teeth in registration; and securing said sections to one another in said aligned position.

11. The method of claim 10, in which said rim surface portion is formed to connect with a substantially axially extending surface.

12. The method of claim 11, in which said forming step comprises stamping each said section from sheet material by a single movement of a stamping tool in said given direction.

13. The method of claim 10, in which said forming step comprises stamping each said section from sheet material by a single movement of a stamping tool in said given direction.

References Cited

UNITED STATES PATENTS

| | | | |
|---|---|---|---|
| 2,641,935 | 6/1953 | Wilken | 29—159 X |
| 2,823,553 | 2/1958 | Harrington | 74—243 |
| 3,026,737 | 3/1962 | Berg | 74—230.5 X |
| 3,172,195 | 3/1965 | Wentling | 29—159 |
| 3,245,273 | 4/1966 | Loper et al. | 29—159 X |

THOMAS H. EAGER, Primary Examiner.

U.S. Cl. X.R.

29—159, 159.2, 463; 74—230.5, 230.8, 243